United States Patent

[11] 3,569,858

[72] Inventors: Wilhelmus Jacobus Witteman; Gerrit Van Der Goot; Johannes Van Der Wal, Emmasingel, Eindhoven, Netherlands
[21] Appl. No.: 733,340
[22] Filed: May 31, 1968
[45] Patented: Mar. 9, 1971
[73] Assignee: U.S. Philips Corporaton, New York, N.Y.
[32] Priority: June 1, 1967
[33] Netherlands
[31] 6707614

[54] DEVICE FOR PRODUCING STIMULATED INFRARED EMISSION, AN IRASER
1 Claim, 1 Drawing Fig.

[52] U.S. Cl. ............ 331/94.5, 350/1, 350/165, 350/166
[51] Int. Cl. ............ H01s 3/05, H01s 3/08, H01s 3/22
[50] Field of Search ............ 331/94.5; 350/1, 165, 166

[56] References Cited
UNITED STATES PATENTS
3,464,028  8/1969  Moeller ............ 331/94.5
FOREIGN PATENTS
849,341  9/1960  Great Britain ............ 350/1
1,113,837  9/1961  Germany ............ 350/1

OTHER REFERENCES
Moeller et al., "Observation of Laser Action in the R-Branch of CO 2 and N 20 vibrational Spectra." applied physics letters, 8, (3) 1 Feb. 66 pp. 69— 70.

Baumeister, "Notes on Multilayer Optical Filters" in Summer Course in .... Optical Design - U of Rochester, Summer, 1963, pp. 20-14 thru 20-18, 20-20, 20-67,69,71,83 and 86.

Mathias, "Stimulated Emission in the Far Infrared...Discharges," Physics Letters 13(1), 1 Nov. 64, pp. 35-— 36

Heitmann, "Zinc Selenide.....laser resonators and interference filters," Z.argew.Phys.1965 (1965)pp.392— 5.

Heitmann, "Zinc Selenide Dielectric Mirror Coating of extremely high reflectivity," Z. Argew. Phys. 21(6) 1966, pp. 503— 8 -incl. english abstract.

Ballard et al. "Thermal Expansion and Other Properties of newer 1-R transmitting Optical Materials" applied Optics 5 (12) pp. 1873— 6; Dec. 1966.

Primary Examiner—Ronald L. Wibert
Assistant Examiner—R. J. Webster
Attorney—Frank R. Trifari ABSTRACT: The invention provides for producing stimulated infrared emission, an iraser, by means of an electric discharge in a gas mixture partly consisting of carbon dioxide in which the discharge space is closed at one end by a concave metal mirror and at the other end by a coupling-out window which covers the whole cross section of the discharge space and also acts as a reflector, according to the invention, this window consists of a plate of zinc selenide which is coated on the discharge side with a few reflection-increasing layers and on the outer side with a reflection-decreasing material. The surface of the plate on the discharge side and the metal reflector at the other end of the discharge between the reflectors.

Patented March 9, 1971
3,569,858
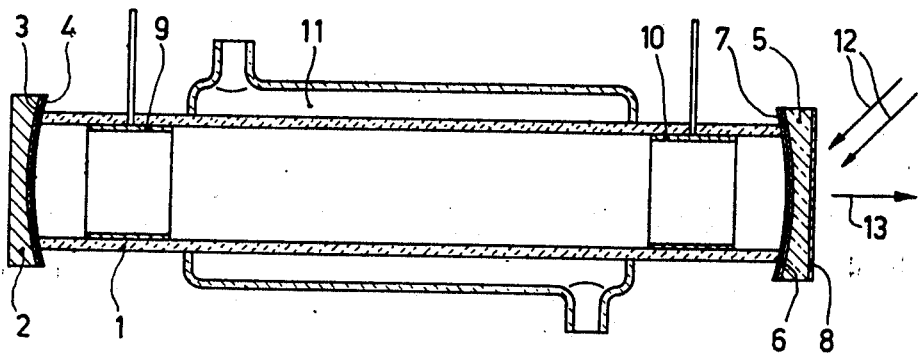
INVENTORS
WILHELMUS J. WITTEMAN
GERRIT VAN DER GOOT
JOHANNES VAN DER WAL
BY
AGENT

DEVICE FOR PRODUCING STIMULATED INFRARED EMISSION, AN IRASER

The invention relates to a device for producing stimulated infrared emission, an iraser, by means of an electric discharge in a gas mixture partly consisting of carbon dioxide, the discharge space being closed at one end by a concave metal mirror and at the other end by a coupling-out window which covers the whole cross section of the discharge space and also acts as a reflector.

With the gradually increasing powers to be produced in the range of 10.6 $\mu$ in a discharge tube having a length of a few metres in a mixture of carbon dioxide, nitrogen, water vapor and helium, the composition of the coupling-out window is one of the major problems. In a tube having a length of 2 m. and a diameter of 22 mm., a continuous power of 103 W could be produced with an efficiency of 12.5 percent. In this case, the coupling-out window consisted of a plane-parallel germanium plate having a thickness of 2 mm., the surfaces of which had been etched. A higher power could not be obtained inter inter alia the absorption of the germanium increases with temperature. The only possible cooling consists of a vigorous current of air.

The invention has for an object to provide a construction with which higher powers can be produced. In a device for producing stimulated infrared emission, an iraser, by means of an electric discharge in a gas mixture partly consisting of carbon dioxide in which the discharge space is closed at one end by a concave metal mirror and at the other end by a coupling-out window which covers the whole cross section of the discharge space and also acts as a reflector, according to the invention, this window consists of a plate of zinc selenide which is coated on the discharge side with a few reflection-increasing layers and on the outer side with a reflection-decreasing material, whilst the surface of the plate on the discharge side and the metal reflector at the other end of the discharge space both have a radius of curvature which is 1.5 to 2 times the distance between the reflectors.

By the use of a construction in accordance with the invention, a larger part of the discharge volume can be utilized as an active medium due to the two concave reflectors. Since the absorption of zinc selenide, which at room temperature is higher than that of germanium, it is true, increases only slightly at a higher temperature, a higher power can be passed by the window. The layers applied to the inner and to the outer side ensure that an adapted reflection and a mimimum absorption are obtained.

The invention will be described more fully with reference to the drawing, which shows an iraser according to the invention.

In the FIGURE, which is a longitudinal sectional view of the discharge tube for an iraser according to the invention, reference numeral 1 denotes a quartz tube having a length of 3 m. and an inner diameter of 20 mm. The tube 1 is closed on the left-hand side by a concave aluminum mirror 2 having a radius of curvature of 4.70 m. and coated with a chromium layer 3 and a gold layer 4. The right-hand side is closed by a window constituted by a concave mirror 5 of zinc selenide having a radius of curvature of 4.70 m. The mirror 5 has a thickness of 2 mm. The inner side is coated with a layer 6 of lead fluoride ($n = 1.74$) and with a layer 7 of zinc selenide ($n = 2.4$) each having a thickness of $$\frac{1}{4}\lambda (\lambda = 10.6\mu)$$

The outer side is coated with a layer 8 of lead fluoride having a thickness of ¼λ. The layers on the inner side serve to attain the value of the reflection desired for the stimulated emission and the layer on the outer side serves to limit the radiation passing to and fro through the window. The reflection on the discharge side is 42 percent. The tube accommodates electrodes 9 and 10 joining the wall and consisting of platinum cylinders of 0.3 mm. thickness. These coaxial electrodes are the subject matter of a copending patent application. A water-cooling jacket 11 surrounds the tube. The window 5 is cooled by a current of air 12. Reference numeral 13 designates the coupled-out beam. The gas filling consists of 1 mm. of $CO_2$, 2.5 mm. of $N_2$, 0.15 mm. of H2O and 6.5 mm. of He.

With a direct-current discharge in the tube of 3 6 mA and an arc voltage of 26 kV (power 940 W), approximately 150 W is emitted in the beam 13 at a wavelength of 10.6 $\mu$. The efficiency is approximately 16 percent.

We claim:

1. A device for producing stimulated infrared emission, comprising means for producing an electric discharge in a discharge space containing a gas mixture partly consisting of carbon dioxide, said discharge space being closed at one end by a concave metal mirror and at the other end by a coupling-out window which covers the whole cross section of the discharge space and also acts as a reflector, said window comprising a plate of zinc selenide coated on the discharge side with reflection-increasing layers and on the outer side with a reflection-decreasing layer, the surface on the discharge side and said concave metal mirror at the other end of the discharge space both having a radius of curvature which is 1.5 to 2 times the distance between the reflectors; wherein said coupling-out window is coated on the inner side with a layer of lead fluoride to which is applied a layer of zinc selenide, which layers both have a thickness of ¼λ, the outer side of said coupling-out window being coated with a layer of lead fluoride having a thickness of ¼λ.